US012411696B2

(12) United States Patent
Zambotti et al.

(10) Patent No.: US 12,411,696 B2
(45) Date of Patent: Sep. 9, 2025

(54) PROGRAMMABLE HARDWARE ACCELERATOR CONTROLLER

(71) Applicants: STMICROELECTRONICS S.r.l., Agrate Brianza (IT); STMicroelectronics International N.V., Geneva (CH)

(72) Inventors: Paolo Sergio Zambotti, Milan (IT); Thomas Boesch, Rovio (CH); Giuseppe Desoli, San Fermo Della Battaglia (IT); Wolfgang Johann Betz, Agrate Brianza (IT); David Siorpaes, Cortina d'Ampezzo (IT)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 298 days.

(21) Appl. No.: 18/176,323

(22) Filed: Feb. 28, 2023

(65) Prior Publication Data

US 2024/0220278 A1 Jul. 4, 2024

Related U.S. Application Data

(60) Provisional application No. 63/477,738, filed on Dec. 29, 2022.

(51) Int. Cl.
*G06F 9/445* (2018.01)
*G06F 9/38* (2018.01)
(Continued)

(52) U.S. Cl.
CPC ........ *G06F 9/44505* (2013.01); *G06F 9/3836* (2013.01); *G06F 9/4498* (2018.02); *G06F 9/5038* (2013.01)

(58) Field of Classification Search
CPC .. G06F 9/44505; G06F 9/3836; G06F 9/4498; G06F 9/5038; G06F 15/7889; G06F 15/7875
See application file for complete search history.

(56) References Cited

U.S. PATENT DOCUMENTS 6,654,819 B1 * 11/2003 Comisky ................. G06F 13/30
710/25
6,757,763 B1 * 6/2004 Preiss .................... G06F 13/387
710/305

(Continued)

FOREIGN PATENT DOCUMENTS

WO 2022133047 A1 6/2022

*Primary Examiner* — Farley Abad
(74) *Attorney, Agent, or Firm* — Seed IP Law Group LLP

(57) ABSTRACT

A system includes a host processor, a memory, a hardware accelerator and a configuration controller. The host processor, in operation, controls execution of a multi-stage processing task. The memory, in operation, stores data and configuration information. The hardware accelerator, in operation preforms operations associated with stages of the multi-stage processing task. The configuration controller is coupled to the host processor, the hardware accelerator, and the memory. The configuration controller executes a linked list of configuration operations, for example, under control of a finite state machine. The linked list consists of configuration operations selected from a defined set of configuration operations. Executing the linked list of configuration operations configures the plurality of configuration registers of the hardware accelerator to control operations of the hardware accelerator associated with a stage of the multi-stage processing task. The configuration controller may retrieve the linked list from the memory via a high-speed data bus.

18 Claims, 13 Drawing Sheets

(51) Int. Cl.
*G06F 9/448* (2018.01)
*G06F 9/50* (2006.01)

(56) References Cited

U.S. PATENT DOCUMENTS

| | | | |
|---|---|---|---|
| 7,877,727 B2* | 1/2011 | Sharp | G06F 9/451 |
| | | | 717/106 |
| 8,572,299 B2 | 10/2013 | Pross et al. | |
| 8,805,306 B2* | 8/2014 | El-Hassan | H04B 17/13 |
| | | | 455/67.11 |
| 9,880,852 B2 | 1/2018 | Tan | |
| 9,965,434 B2 | 5/2018 | Verplanken et al. | |
| 10,402,527 B2 | 9/2019 | Boesch et al. | |
| 10,417,364 B2 | 9/2019 | Boesch et al. | |
| 11,308,406 B2 | 4/2022 | Arrigoni et al. | |
| 2009/0144461 A1* | 6/2009 | Lampe | G06F 15/7867 |
| | | | 710/22 |
| 2010/0293420 A1* | 11/2010 | Kapil | G06F 12/0815 |
| | | | 711/135 |
| 2011/0289298 A1 | 11/2011 | Tsuji | |
| 2012/0084543 A1 | 4/2012 | Pross et al. | |
| 2012/0221747 A1 | 8/2012 | Mei et al. | |
| 2012/0291126 A1* | 11/2012 | Lagar-Cavilla | H04W 12/128 |
| | | | 726/22 |
| 2014/0043000 A1* | 2/2014 | Bojarski | F02D 41/20 |
| | | | 323/272 |
| 2014/0281484 A1* | 9/2014 | Kurkowski | H04L 63/0428 |
| | | | 713/153 |
| 2015/0052332 A1* | 2/2015 | Mortensen | G06F 15/7889 |
| | | | 712/37 |
| 2018/0189229 A1 | 7/2018 | Desoli et al. | |
| 2018/0189641 A1 | 7/2018 | Boesch et al. | |
| 2020/0159692 A1 | 5/2020 | Shah et al. | |
| 2022/0198114 A1* | 6/2022 | Raumann | G06F 13/28 |

* cited by examiner

PROGRAMMABLE HARDWARE ACCELERATOR CONTROLLER

BACKGROUND

Technical Field

The present disclosure generally relates to programmable hardware accelerators, such as convolutional accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Programmable hardware accelerators are often employed to accelerate the processing of large amounts of data by a DCNN.

The programmable hardware accelerators may support a complex task using sequential execution of pipelined stages or epochs. Each stage is typically configured using a bus interface, with the configuration being managed using a host processor or a dedicated microcontroller.

BRIEF SUMMARY

In an embodiment, a device comprises a hardware accelerator, a memory and a configuration controller coupled to the hardware accelerator and to the memory. The hardware accelerator comprises a plurality of configuration registers. The configuration controller, in operation, executes a finite state machine. The finite state machine controls execution of a linked list of configuration operations. The linked list of configuration operations consist of configuration operations selected from a defined set of configuration operations. The executing the linked list of configuration operations configures the plurality of registers of the hardware accelerator to control operations of the hardware accelerator associated with a stage of a multi-stage processing task.

In an embodiment, a system comprises a host processor, a memory, a hardware accelerator, and a configuration controller. The host processor, in operation, controls execution of a multi-stage processing task. The memory, in operation, stores data and configuration information. The hardware accelerator includes a plurality of functional circuits and a plurality of configuration registers. The configuration controller is coupled to the host processor, the hardware accelerator, and the memory. The configuration controller, in operation, executes a finite state machine to control execution of a linked list of configuration operations, the linked list of configuration operations consisting of configuration operations selected from a defined set of configuration operations. Executing the linked list of configuration operations configures the plurality of configuration registers of the hardware accelerator to control operations of the hardware accelerator associated with a stage of the multi-stage processing task.

In an embodiment, a method comprises retrieving, by a configuration controller from a memory, configuration operations of a linked list of configuration operations, the linked list of configuration operations consisting of configuration operations selected from a defined set of configuration operations; and executing, under control of a finite state machine executed by the configuration controller, the retrieved configuration operations of the linked list of configuration operations. The executing of the retrieved configuration operations of the linked list of configuration operations configures a plurality of registers of a hardware accelerator to control operations of the hardware accelerator associated with a stage of a multi-stage processing task controlled by a host processor.

In an embodiment, a non-transitory computer-readable medium's contents cause a configuration controller to perform a method. The method comprises sequentially executing individual operations of a linked list of configuration operations under control of a finite state machine executed by the configuration controller. The linked list of configuration operations consists of configuration operations selected from a defined set of configuration operations. The executing of the linked list of configuration operations configures a plurality of registers of a hardware accelerator to control operations of the hardware accelerator associated with a stage of a multi-stage processing task controlled by a host processing system.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figures 1, 2:
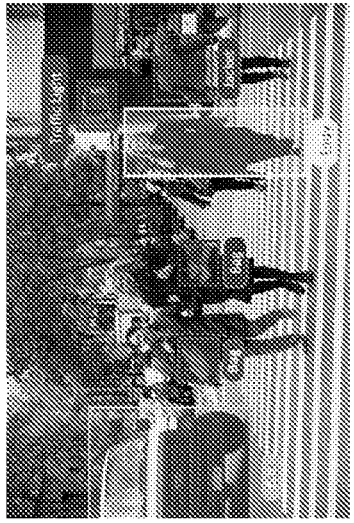
FIG. 1 is a conceptual diagram illustrating a digit recognition task.
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
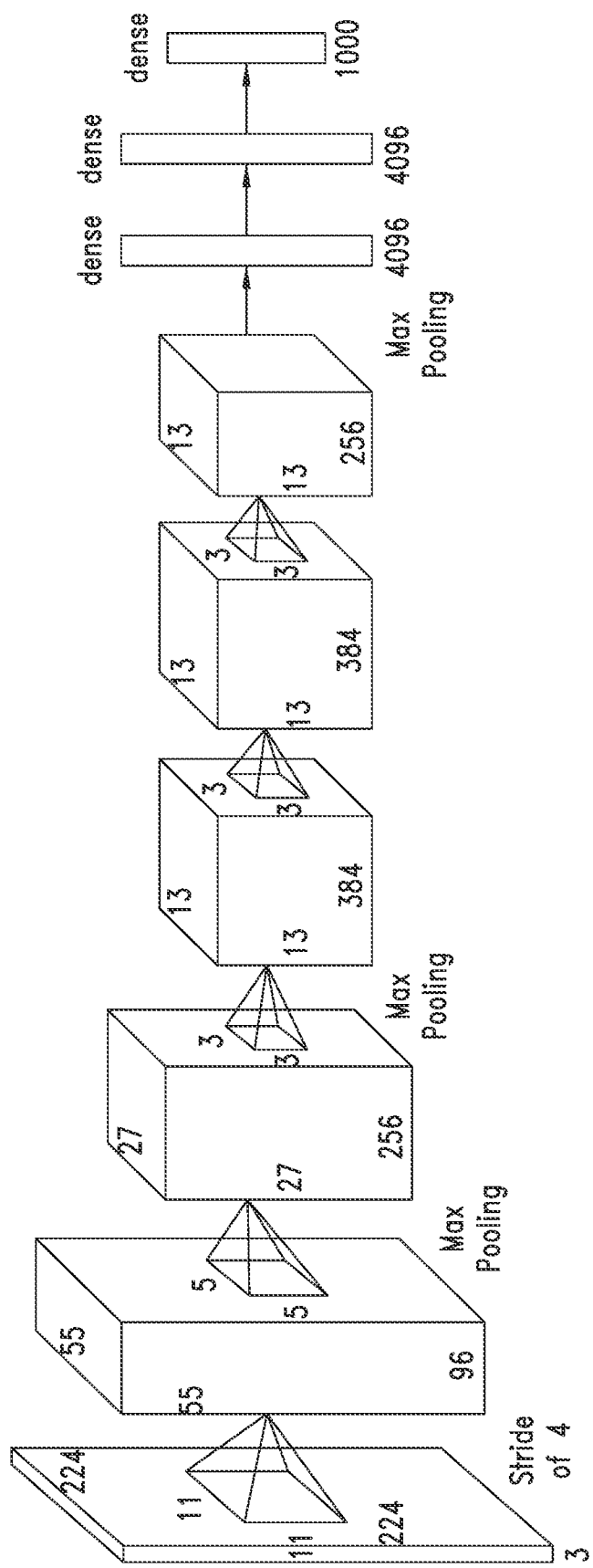
FIG. 3 is a conceptual diagram illustrating an example of a CNN.

CNNs are specific types of deep neural networks (DNN) with one or multiple layers which perform a convolution on a multi-dimensional feature data tensor (e.g., a three-dimensional data tensor having width×height×depth). The first layer is an input layer and the last layer is an output layer. The intermediate layers may be referred to as hidden layers. The most used layers are convolutional layers, fully connected or dense layers, and pooling layers (max pooling, average pooling, etc). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
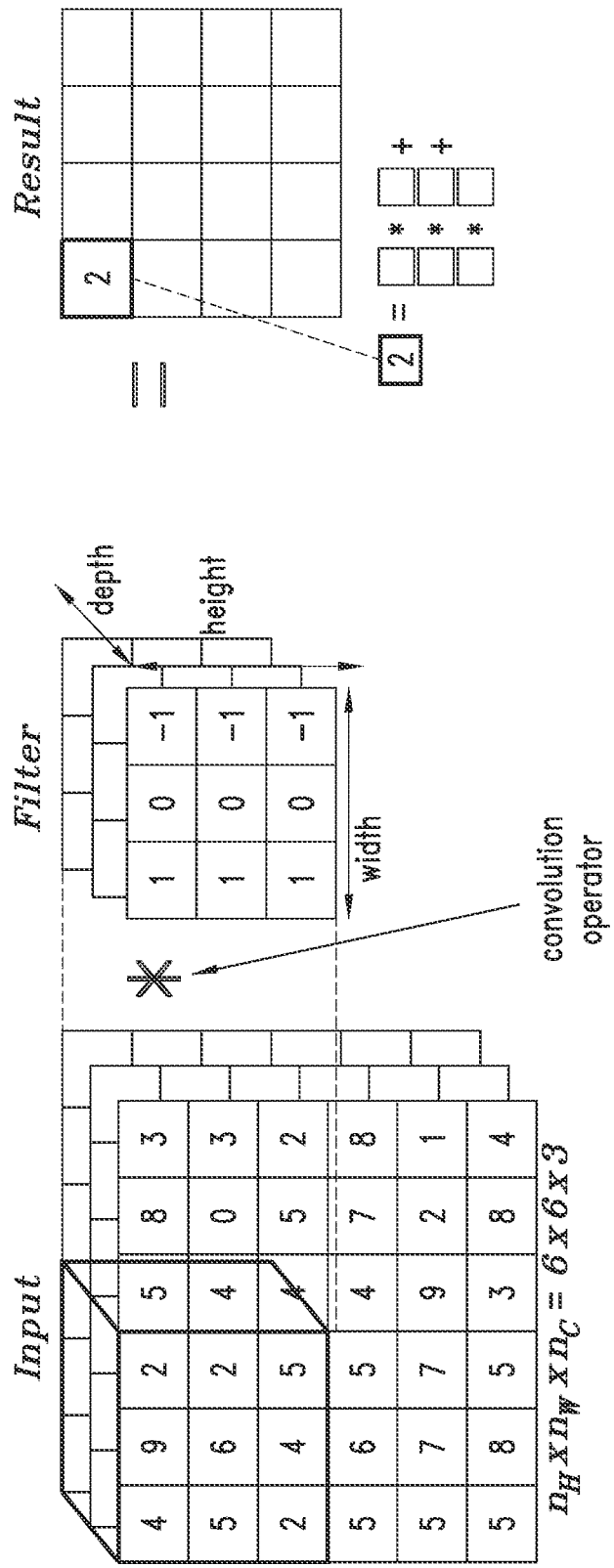
FIG. 4 is a conceptual diagram illustrating an example convolutional layer of a CNN.

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating an example application of a kernel to a feature map, producing a two-dimensional feature map having a height of 4 and a width of 4.

Figure 5:
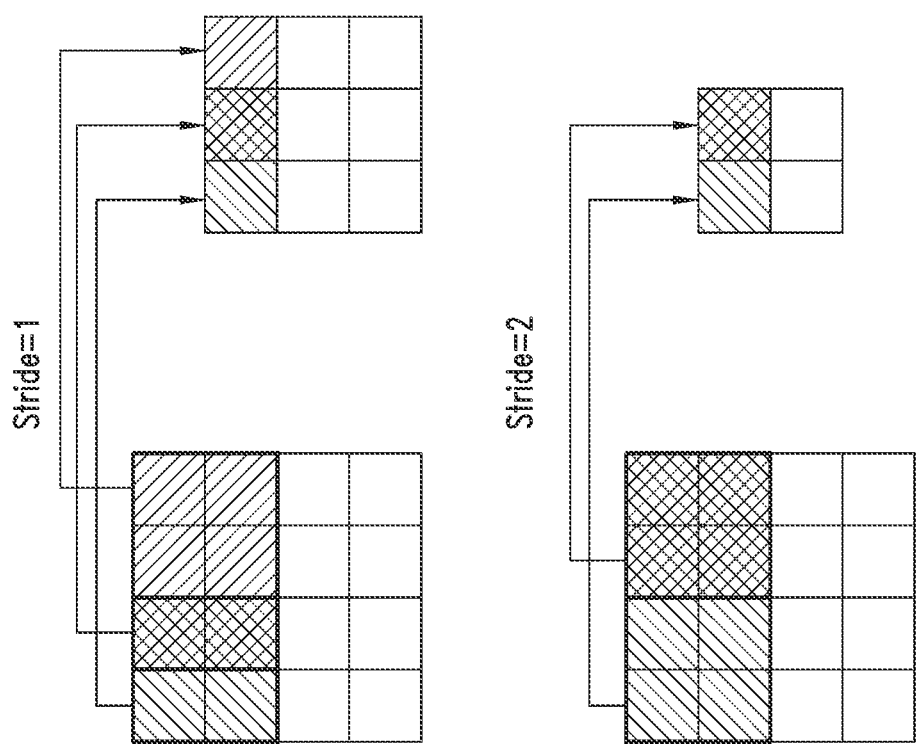
FIG. 5 is a conceptual diagram illustrating strides of convolutional layers of a CNN.
Figure 6:
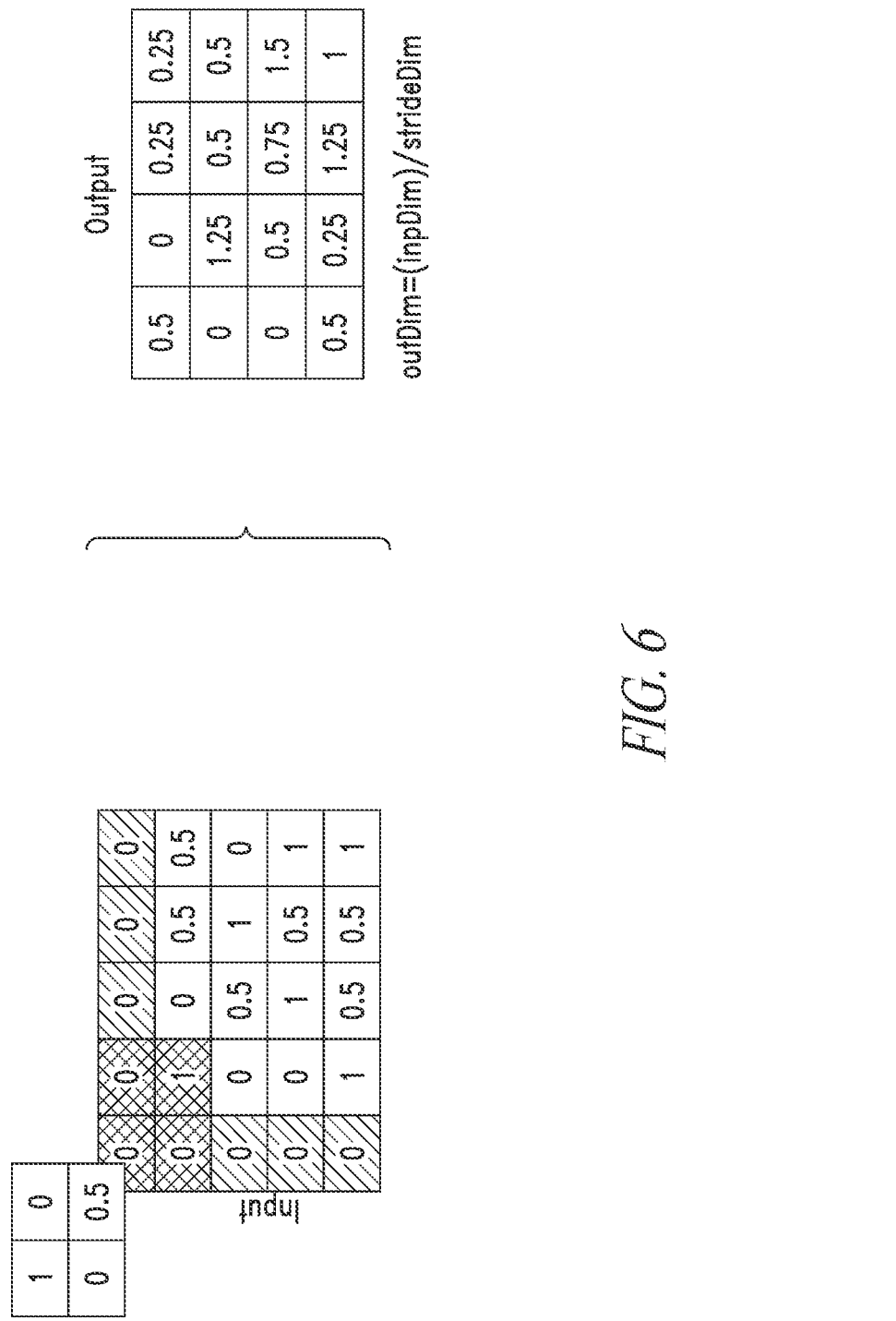
FIG. 6 is a conceptual diagram illustrating application of padding of an input feature map to preserve height and width dimensions during a convolutional.

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters. The stride hyper-parameter indicates a step-size used to slide kernels across an input feature map. FIG. 5 is a conceptual diagram comparing a stride of 1 and a stride of 2. The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map.

Figure 7:
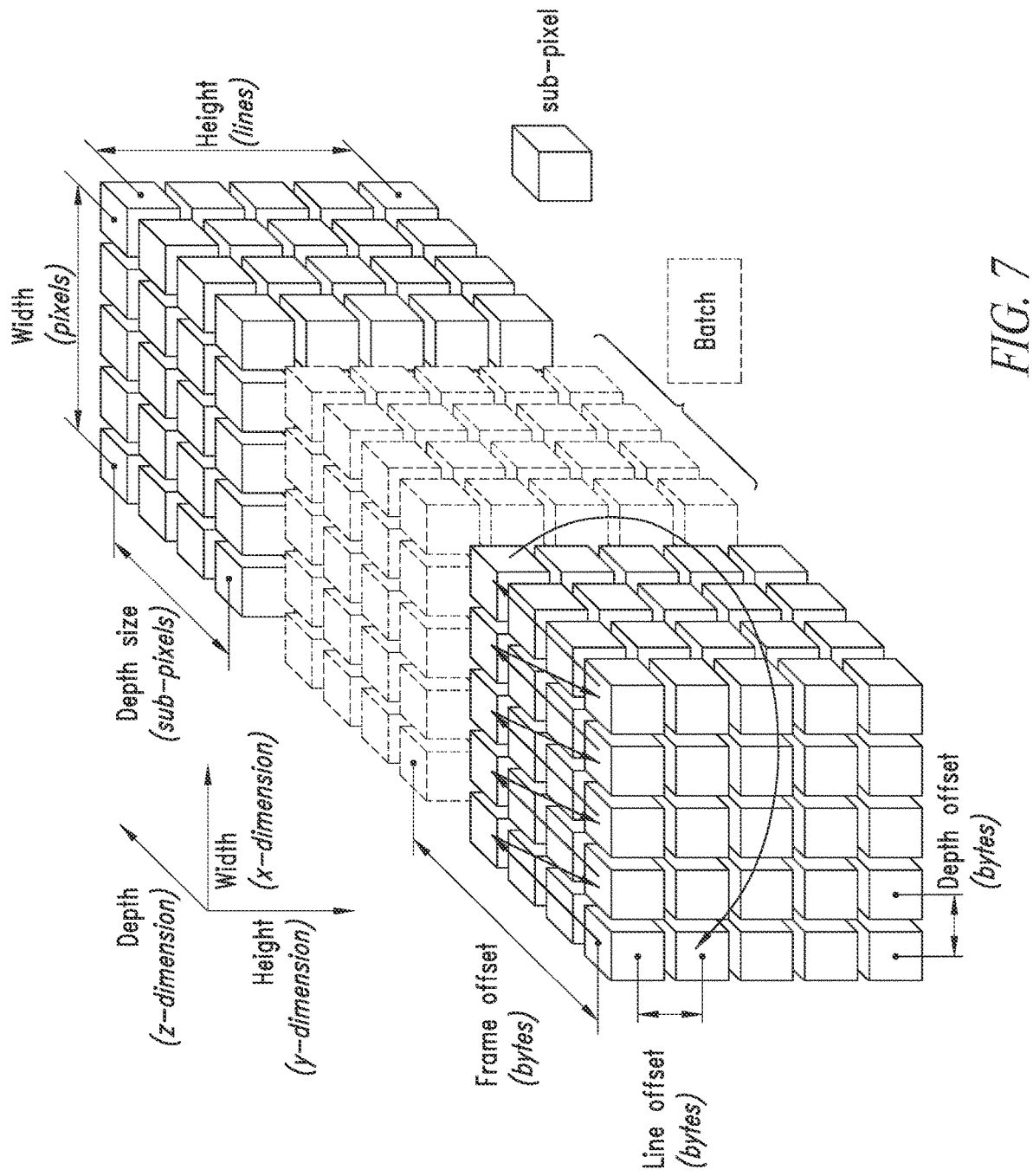
FIG. 7 is a conceptual diagram illustrating loading of feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
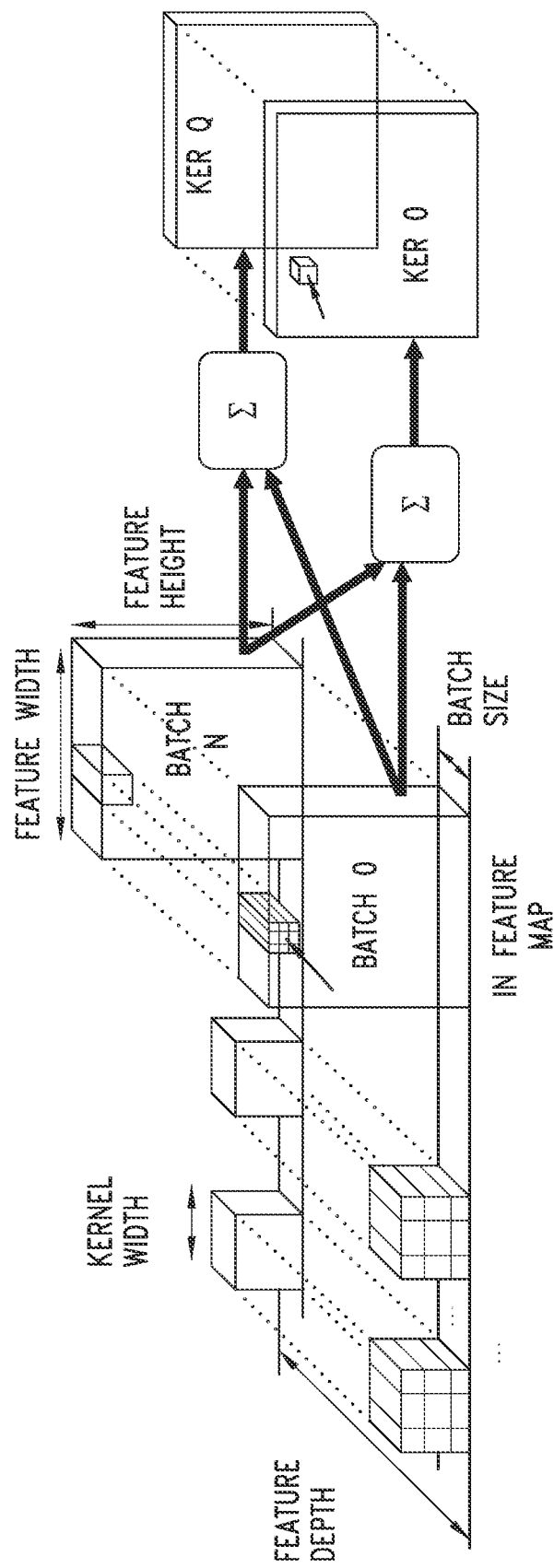
FIG. 8 is a conceptual diagram illustrating processing of a convolution in batches.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

As can be seen, the computations performed by a CNN, or by other neural networks, often include repetitive computations over large amounts of data. For this reason, computing systems having hardware accelerators may be employed to increase the efficiency of performing operations associated with the CNN.

Figure 9:
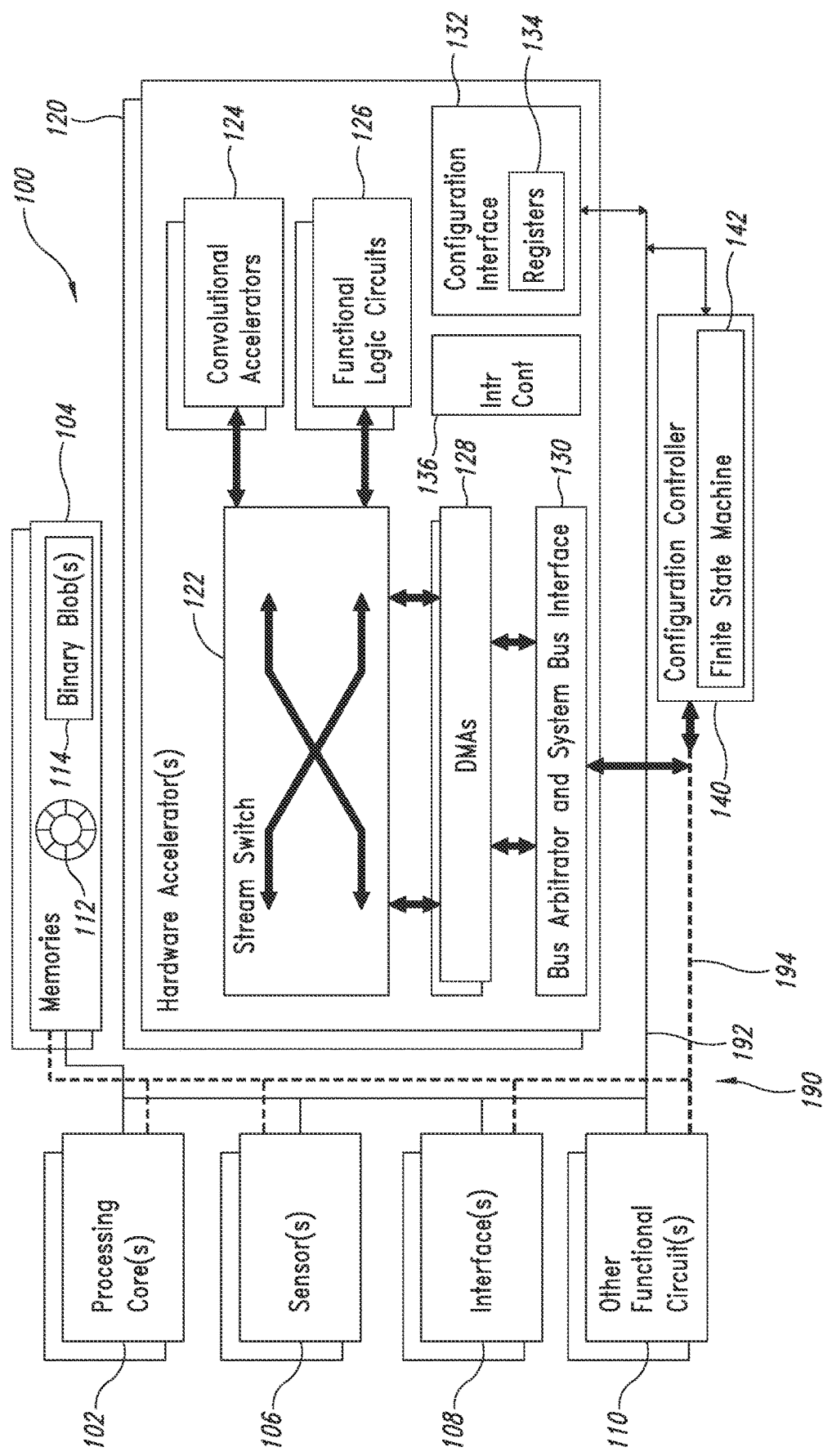
FIG. 9 is a functional block diagram of an embodiment of an electronic device or system employing a programmable hardware accelerator.

FIG. 9 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100. As illustrated, the memory includes one or more circular buffers 112, which may be implemented using cells of a memory array, a set of general purpose registers, etc.

The system 100 may include one or more sensors 106 (e.g., image sensors, audio sensors, accelerometers, pressure sensors, temperature sensors, etc.), one or more interfaces 108 (e.g., wireless communication interfaces, wired communication interfaces, etc.), and other functional circuits 110, which may include antennas, power supplies, one or more built-in self-test (BIST) circuits, etc., and a main bus system 190. The main bus system 190 may include one or more data, address, power, interrupt, and/or control buses coupled to the various components of the system 100. As illustrated, the main bus system 190 comprises a configuration and data bus 192, and a fast data bus 194. Proprietary bus systems and interfaces may be employed, such as Advanced extensible Interface (AXI) bus systems and interfaces.

The system 100 also includes one or more hardware accelerators 120 which, in operation, accelerate the performance of one or more operations, such as operations associated with implementing a CNN. The hardware accelerator 120 as illustrated includes one or more convolutional accelerators 124 and one or more functional logic circuits 126 to facilitate efficient performance of convolutions and other operations associated with layers of a CNN. The hardware accelerator 120 as illustrated also includes a stream switch 122, and one or more streaming engines or DMA controllers 128. The stream switch 122, in operation, streams data between the convolutional accelerators 124, the functional logic circuits 126 and the streaming engines or DMAs 128. A bus arbiter and system bus interface 130 facilitates transfers of data, such as streaming of data, between the hardware accelerator 120 and other components of the system 100, such as the processing cores 102, the memories 104, the sensors 106, the interfaces 108, and the other functional circuits 110, via the fast data bus 194. A control register interface 132 receives configuration information via the configuration and data bus 192 and stores configuration information in one or more configuration registers 134. An interrupt controller 136 manages transmission and receipt of interrupt signals, such as transmission of interrupts to a host processor 102.

As mentioned above, programmable hardware accelerators support complex tasks using sequential execution of pipelined stages of the task. The complex task or algorithm is split into a plurality of pipelined stages. For example, a first stage may download or stream data from the memory 104 or a data source (e.g., a sensor 106), or both, to the hardware accelerator 122, process the received data, for example, using one or more convolutional accelerators 124, one or more functional circuits, etc., and generate and store interim results of an algorithm in the memory 104. A subsequent stage may retrieve the interim results and perform additional processing on the interim results. A last stage of the plurality of stages provides a result of the algorithm. There may be hundreds or even thousands of stages in a complex task.

The hardware accelerator 120 needs to be programmed to perform the data transfers and other operations associated with each stage. For example, the hardware accelerator 120 needs to be programmed with data source and destination address information, stream switch 122 and other component configuration information, hyper-parameter information, IP security status information (e.g., defining resources available to separate networks using the hardware accelerator in parallel), etc., prior to the execution of each stage.

Typically, the configuration of each stage of a programmable hardware accelerator is managed using a host processor or a dedicated general purpose microcontroller via a configuration and data bus. For example, in the illustrated embodiment, each stage may be configured by a host processing core or a dedicated coprocessor 102, sending configuration information and instructions via the configuration and data bus 192 to the configuration interface 132. After a stage of the algorithm is completed, the hardware accelerator is reconfigured using the host processor or dedicated coprocessor 102 to perform operations associated with a subsequent stage.

The reconfiguration process between each stage typically takes a non-negligible amount of time, introduces latencies, and consumes a lot of system resources, such as memory resources, bus bandwidth, host CPU effort, dedicated coprocessor resources and effort, silicon area, etc. For example, a host 102 or a host in combination with a dedicated general purpose processor needs to execute code (e.g., C code), employ firmware, etc., which needs to be stored in memory and which takes time to decode and execute.

In addition, the reconfiguration process of a stage is typically managed using the configuration and data bus 192, which is shared with other system processes. Managing the reconfiguration through a shared bus may introduce additional latency issues in both the configuration of a stage, and in other processes sharing the bus. The particular configuration of the host system 100 may vary significantly (e.g., number of processes or processors 102 sharing a bus 192, etc.), and may typically not be known to the hardware accelerator 120 or to the designer of the hardware accelerator, which may introduce additional unexpected delays, etc.

The reconfiguration process also may raise security issues related to the source code, the binary libraries, the firmware, etc. This information may be obtained by an attacker and used to determine an algorithm or configuration information intended to be kept secret.

To facilitate configuring of the pipelined stages while reducing latency and resource costs as compared to conventional host processor or dedicated coprocessor approaches, the system 100 includes a logic programmable configuration controller 140. The configuration controller 140, in operation, executes a linked list of configuration operations, which may be stored as a binary blob 114 in the memory 104, to configure one or more hardware accelerators 120.

The available configuration operations are selected from a small set of configuration operation, and configuration process may be managed by a finite state machine 142, as discussed in more detail below. The memory 104 may store a plurality of binary blobs having link lists of configuration operations for configuring different stages of a complex processing task. The configuration controller 140 may typically be located adjacent to or included in the hardware accelerator 120, and may access the configuration and data bus 192 and the fast bus 194 to manage the configuration processes associated with the stages using the finite state machine 142.

Embodiments of the system 100 of FIG. 9 may include more components than illustrated, may include fewer components than illustrated, may combine components, may separate components into sub-components, and various combination thereof. For example, various intellectual properties (IPs) of the hardware accelerator (e.g., the stream switch 122) may include dedicated control registers to store control information to control the stream switch 122, line buffers and kernel buffers may be included in the hardware accelerator 120 to buffer feature line data and kernel data provided to the convolutional accelerators 124, etc., and various combinations thereof. In another example, cryptographic circuitry may be included in the bus arbitrator and system bus interface 130 to facilitate streaming of confidential data streams, etc. In another example, the configuration controller 140 may be embedded in the hardware accelerator 120, as mentioned above.

Figure 10:
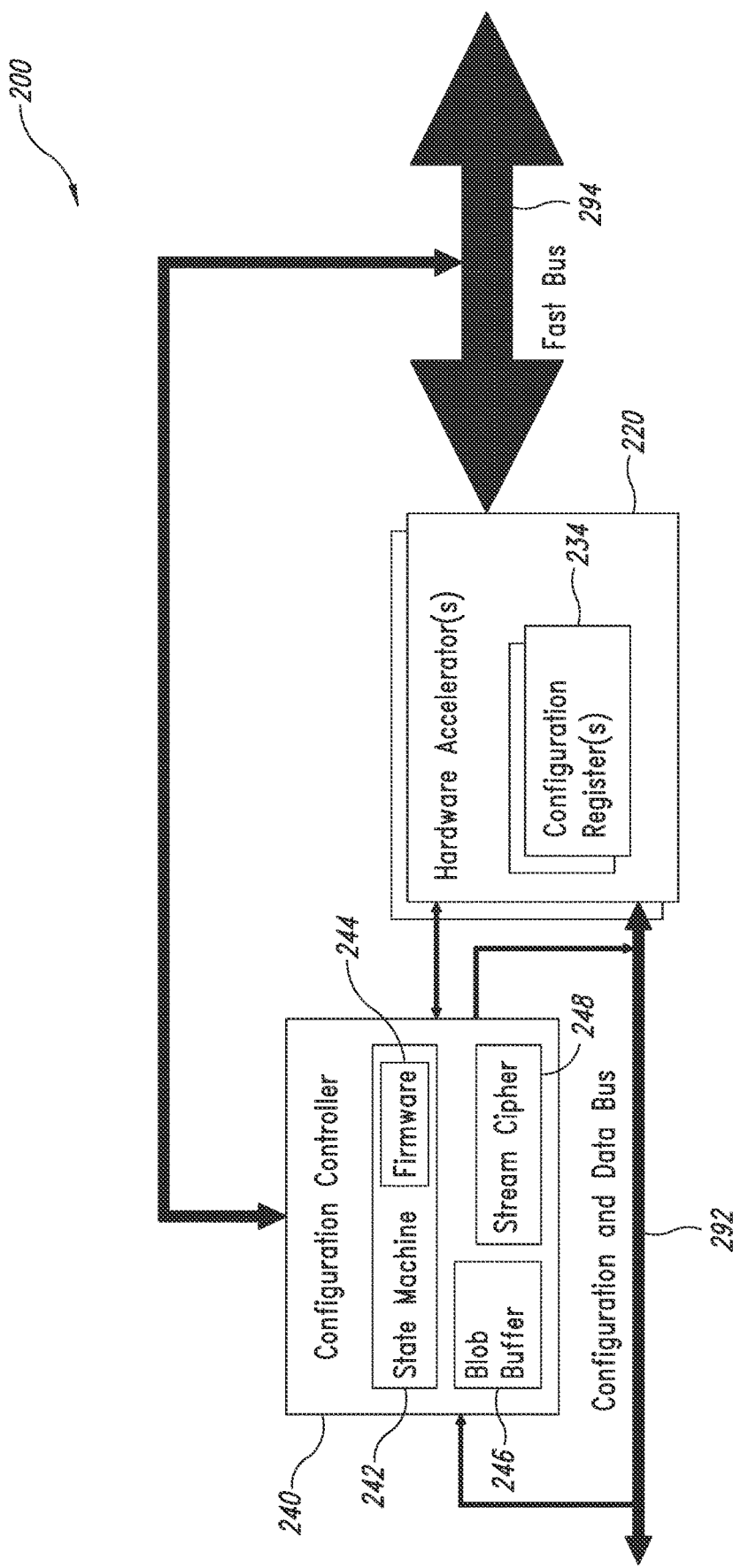
FIG. 10 is a functional block diagram of an embodiment of an electronic device or system having a hardware accelerator employing a configuration controller.

FIG. 10 is a functional block diagram of an embodiment of a system 200 including one or more hardware accelerators 220 and a configuration controller 240. The hardware accelerators 220 and configuration controller 240 may be employed, for example, as the hardware accelerators 120 and configuration controller 140 in FIG. 9. Hardware accelerator 220 of FIG. 10 may be similar to hardware accelerator 120 of FIG. 9, and as illustrated includes a plurality of configuration registers 234, each of which may be associated with a respective intellectual property (e.g., a stream switch 122, a convolutional accelerator 124) of the hardware accelerator 220. Other details of hardware accelerator 220 of FIG. 10 are omitted from the drawing for ease of illustration.

The hardware accelerator 220 is coupled to a configuration and data bus 292 and to a fast data bus 294. The configuration controller 240 also is coupled to the configuration and data bus 292 and to the fast data bus 294. The configuration and data bus 292 and the fast bus 294 may be coupled to other components of the system 200, such as one or more processors, one or more memories, etc. (see processors 102 and memories 104 of FIG. 9).

The configuration controller 240 executes a state machine 242 to manage the process of configuring one or more of the hardware accelerators 220 using linked lists of configuration operations consisting of configuration operations selected from a defined set of configuration operations, as discussed in more detail below. The state machine 242 may be configured using firmware 244.

The configuration controller 240 as shown includes an optional blob buffer 246, which in operation may store a linked list of configuration operations, such as a list retrieved from a binary blob 114 stored in the memory 104. The configuration controller 240 as shown also includes optional cryptographic circuitry 248, as illustrated a stream cipher engine 248, which, in operation, may decrypt a linked list of operations stored in an encrypted form in a binary blob 114. The decrypted linked list may be stored in the blob buffer 246.

Embodiments of the system 200 of FIG. 10 may include more components than illustrated, may include fewer components than illustrated, may combine components, may separate components into sub-components, and various combination thereof. For example, the blob buffer 246 may be omitted in some embodiments, and another memory (e.g., a feature line buffer or kernel buffer) repurposed as a blob buffer during configuration of a stage. In another example, the configuration controller 240 may be embedded in a hardware accelerator 220.

Figure 11:
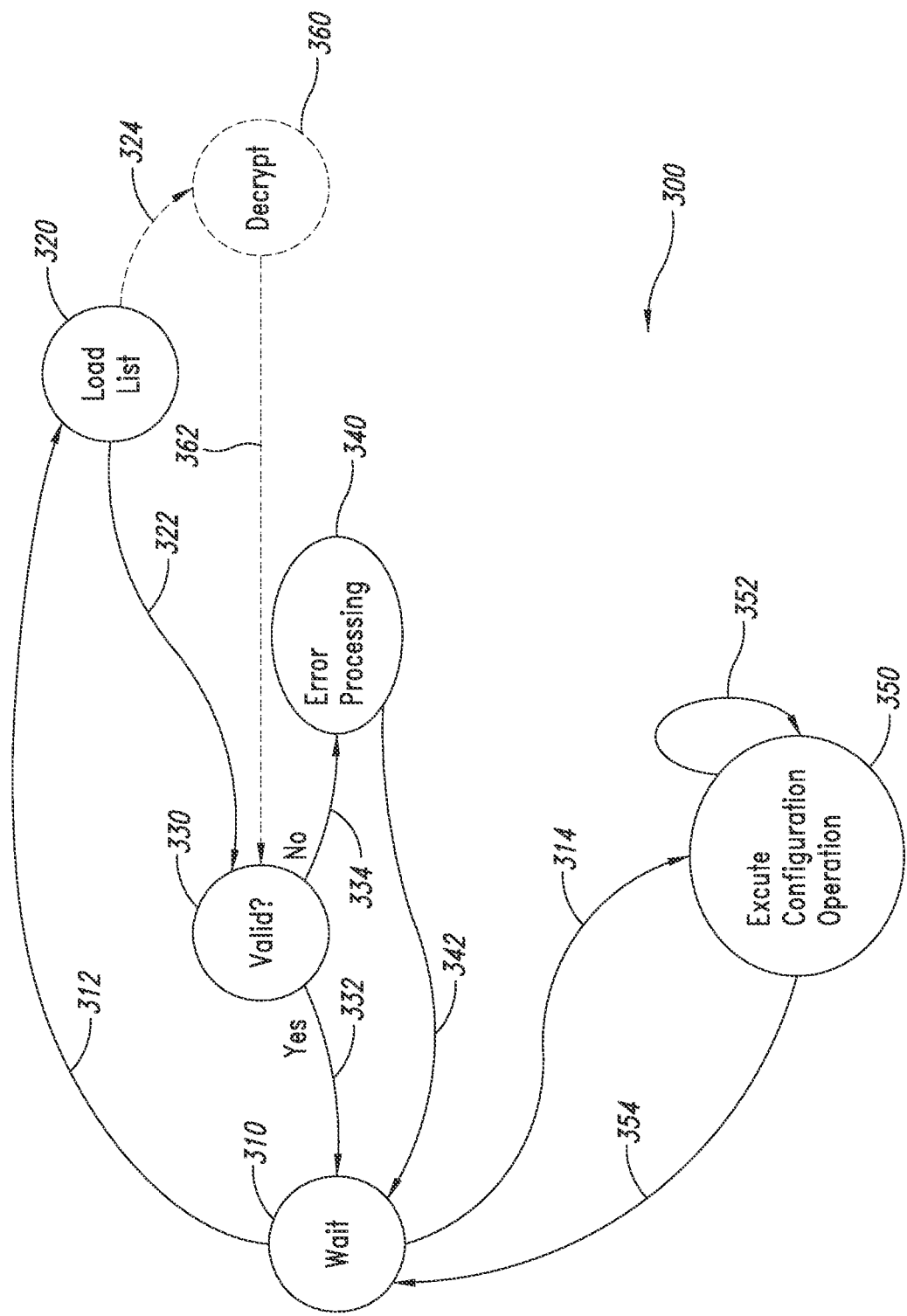
FIG. 11 illustrates an embodiment of a state machine that may be employed by a configuration controller to program one or more hardware accelerators to perform a stage of a task.

FIG. 11 illustrates an example embodiment of a finite state machine 300 that may be employed by the configuration controller 240 of FIG. 10 as the state machine 242 to manage configuration of one or more hardware accelerators 220 to perform stages of a complex task. The state machine 300 sequentially executes configuration operations in a linked list of configuration operations that may be stored as a binary blob in a memory, such as in one of the binary blobs 114 stored in the memory 104 of FIG. 9, or the linked list 400 of FIG. 12, discussed in more detail below. A host processor, such as the host processor 102 of FIG. 9, may use interrupts to, for example initiate loading of the linked list and executing of the loaded linked list by the state machine 300 of the configuration controller. Similarly, the configuration controller 240 may use interrupts to communicate with the hardware accelerators 220, for example, to communicate with a configuration interface of one or more hardware accelerators 220 (see configuration interface 132 of FIG. 9). Example states and transitions of the state machine 300 will be discussed with reference to FIGS. 9 and 10 for convenience.

At state 310, the state machine 300 waits for an indication to proceed to another state, which may be received, for example, from a host processor 102 via a configuration and data bus 292. For example, a host processor 102 may send an indication, such as an interrupt, to the configuration controller 240, to load a linked list of configuration operations from an address in memory, such as a linked list stored as a binary blob 114 at an address in memory 104 or in an external memory. The linked list of configuration operations may be used by the configuration controller 240 to configure one or more hardware accelerators 220 to perform a stage of a complex task.

In response to receiving an indication in state 310 to load a linked list of operations from a memory address, the state machine 300 transitions 312 from state 310 to state 320. At state 320, the state machine 240 loads the linked list of configuration operations. This may be done, for example, using the configuration bus 292 or the fast data bus 294 of FIG. 10, to retrieve a binary blob 114 starting at the indicated address in the memory 114. The binary blob 114 comprises the linked list of configuration operations or microinstructions. An indication of a length of the binary blob, such as a number of words in the binary blob 114, may be included, for example, in the indication to load the linked list of configuration operations or in the binary blob 114, for example, at a determined word in the binary blob 114, such as the second word. The indication of the length of the binary blob may be used by the state machine 300 at state 320 to determine when loading of the binary blob is complete. Direct access by the configuration controller 240 to the list stored in the memory 104 via the configuration bus 292 or the fast data bus 294 facilitates faster programming of configuration registers of the hardware accelerator 220, such as configuration registers 234, because the bus structure to support transactions using the host processor or a dedicated coprocessor may be bypassed to load the list of configuration operations stored in the binary blob. After the list is loaded, the state machine 300 transitions 322 from state 320 to state 330.

At state 330, the state machine 300 optionally determines whether the link list of operations stored in the binary blob 114 is a valid list of linked operation. For example, the list may include a blob check value at an expected location in the linked list, such as a first word in the binary blob. The blob check value may be a default value indicating the blob is a configuration blob, or a value unique to a blob associated with configuration of a particular stage. At state 330, the list is checked to determine whether the expected blob check value or default value is detected in the expected location of the blob 114.

When the list is determined to be valid at state 330, e.g., the expected blob check value or default value is detected at the expected location, the configuration controller 240 may notify the host processor 102 that loading of the list is complete, for example, using an interrupt. The state machine 300 transitions 332 from state 330 to state 310 to wait for a next indication to transition to another state, such as an interrupt received from the host processor 102.

When the list is not determined to be valid at state 330, e.g., the expected blob check value or default value is not detected at the expected location, the state machine 300 transitions 334 from state 330 to state 340, where error processing may occur, such as sending an interrupt to the host processor 102 indicating an error in loading the linked list of configuration operations. The state machine 300 transitions 342 from state 340 to state 310 to wait for a next indication to transition to another state, such as an interrupt received from the host processor 102.

After receiving an indication the loading of the list of configuration operations is complete, the host processor 102 may send an indication, such as an interrupt, to the configuration controller 240 to start the process of configuring one or more hardware accelerators 220 using a retrieved linked list of configuration operations.

The state machine 300 responds to the indication to start the process of configuring one or more hardware accelerators 220 by transitioning 314 from state 310 to state 350. At state 350, an operation in the list of configuration operations is performed. When there are more operations in the list of configuration operations to perform, the state machine 300 remains 352 in state 350 to continue sequential execution of the operations in the list of configuration operations. When execution of the configuration operations in the list of configuration operations is complete, the state machine 350 transitions 354 to state 310 to wait for an next indication to transition to another state, such as an indication to load another linked list of configuration operations associated with configuring one or more hardware accelerators 220 to perform a different stage of a complex task; an indication to configure another hardware accelerator 240 using the retrieved linked list of configuration operations, etc. In some embodiments, a stop operation in the linked list may cause the state machine 300 to transition 354 from state 350 to state 310. For example, a stop operation may be a last operation in the linked list of configuration operations.

Embodiments of the state machine 300 of FIG. 11 may include more states and transitions than illustrated, may include fewer states and transition than illustrated, may combine states, may separate states into sub-states, may include different transitions, and various combination thereof. For example, in some embodiments the state machine 300 may include an optional decryption state 360 (illustrated in dashed lines in FIG. 11). When loading of a list of configuration operations is complete, the state machine 300 may transition 324 from state 320 to the decryption state 360 instead of transitioning 322 from state 320 to state 330. When decrypting of the list of configuration operations is complete, the state machine 300 may transition 362 from state 360 to state 330. In another example, state 350 may include sub-states to perform different configuration operations in the list of configuration operations. In another example, state 350 may employ an optional step-mode, and transition to state 310 to wait after execution of individual configuration operation for an indication, such as an interrupt, to execute the next configuration operation. The step-mode may be useful, for example, to perform debugging operations. In another example, the state machine may transition from state 310 to state 330 to check the validity of a blob before transitioning to state 320 to load the linked list. In another example, words of the blob may be retrieved as needed by the state machine (see state machine 500 of FIG. 13).

In some embodiments, the configuration controller 240 may configure multiple hardware accelerators to perform a stage of a complex task in parallel, which facilitates reducing the processing costs and latencies associated with configuring a system including multiple hardware accelerators to perform a complex task, such as the system 100 of FIG. 9 or the system 200 of FIG. 10.

As noted above, the list of configuration operations or microinstructions may be stored as a binary blob. The individual operations or instructions of the list are selected from a defined set of simple microinstructions. The defined set is kept small to facilitate use of configuration logic or a state machine instead of a general purpose processor to manage the configuration of the hardware accelerator. The binary blob 114 may be placed in a memory space, such as the memory 104, accessible through the fast bus 194, 294.

Figure 12:
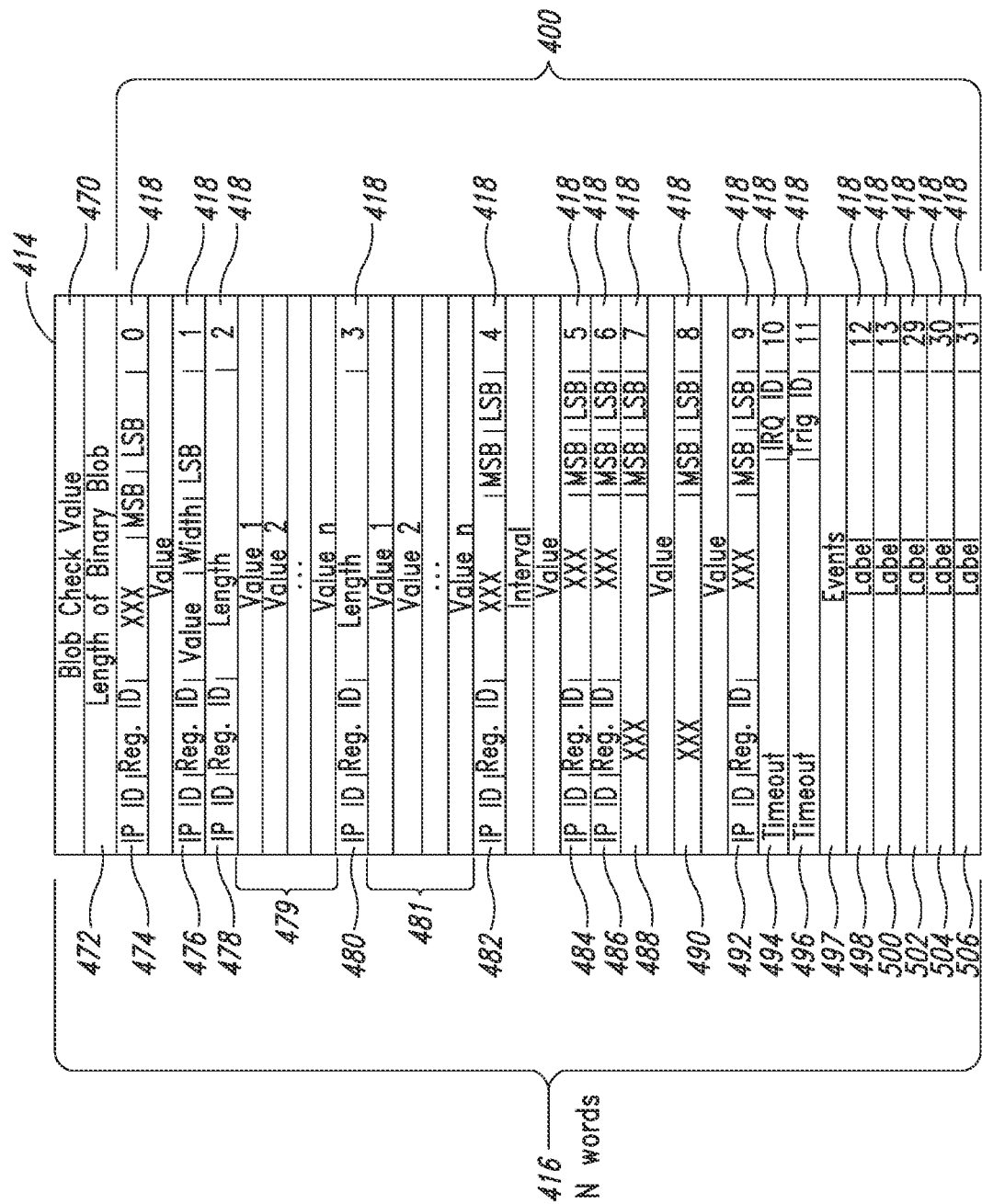
FIG. 12 is a conceptual diagram illustrating an example linked list of configuration operations that may be employed to configure one or more hardware accelerators to perform a stage of a complex processing task.

FIG. 12 is a conceptual diagram illustrating an example linked list 400 of configuration operations that may be employed by a configuration controller to configure one or more hardware accelerators to perform a stage of a complex processing task. For convenience, FIG. 12 will be described with reference to FIGS. 9-11.

In FIG. 12, the link list 400 is stored in a binary blob 414. For example, the linked list 400 may be stored as a binary blob 114 in the memory 104 of FIG. 9. The binary blob 414 as illustrated comprises a number of words N 416. The individual words stored in the binary blob 414 may typically be aligned with word addresses in the memory storing the blob (e.g., a set of 32 bit words starting at an address in the memory 104).

As illustrated, the first word, or start word, of the blob 414 is a blob check value or default value 470, which as discussed above, may be used by the configuration controller 240 to verify the correct blob 114 has been found at the indicated address. The blob check value 470 may be stored in other determined words of the blob 414, but may typically be the first word of a blob 414 storing a linked list 400 of configuration operations.

As illustrated, the next word of the blob 414 is a blob length indicator 472, which comprises a value indicating a length of the blob 414 in words. The blob length value 472 may be used by the configuration controller 240 to determine the size of a binary blob 114 to retrieve from the memory 104. The blob length value 472 may typically indicate a blob length in words (e.g., 32 bit words), excluding the start word 470 and blob length indicator word 472.

A blob length indicator 472 may typically be the second word of a blob 414 storing of a linked list of configuration operations 400.

As illustrated, the remaining words 416 of the blob 414 comprises the linked list of configuration operations 400 and respective data values and control parameters associated with specific configuration operations of the linked list of configuration operations 400. A last field of each configuration operation comprises an operation code field 418, a value of which indicates to the configuration controller 240 the configuration operation to perform. As the number of configuration operations available is limited to a defined set of configuration operations, the number of bits of the operation code field 418 may be small. For example, a 5 bit operation code field is sufficient to indicate up to 32 different configuration operations. The operation code field 418 may be located as a different position in the words 416 of the blob 414, and not just in the last field as indicated. For example, the operation code field 418 may be the first 5 bits of a word 416, etc.

The first example operation in the example linked list 400 of configuration operations is a write operation 474 to write a single value to a configuration register, such as a configuration register 234 of the hardware accelerator 220 of FIG. 10. As illustrated, the word 416 containing the write operation 474 includes an intellectual property identifier IP ID, a register identifier Reg ID, a most significant bit indicator MSB, a least significant bit indicator LSB, and an operation code 418, and a next word 216 of the blob 414 contains a value Value associated with the write operation 474. As illustrated, the value of the operation code is 0, which indicates the configuration operation is a write operation.

The values of the intellectual property identifier IP ID and the register identifier Reg ID indicate to the configuration controller 240 the particular IP and the particular register of the particular IP on which the write operation 474 is to be performed. The most significant bit indicator MSB and the least significant bit indication LSB indicate the range of bits of the register to which the value in the next word are to be written. Typically, a write operation 474 is performed as a read-modify-write operation. When the range specified by the most significant bit indicator MSB and the least significant bit indication LSB is equal to the size of the register, a simple write to the register may be performed.

It is noted that not all of the bits of the word 416 storing the write operation 474 in the blob 414 are used to convey parameters or data associated with the write operation 474 to the configuration controller 240. This is shown with a field containing unused values xxx of the word 216.

The second example operation in the example linked list 400 of configuration operations is a write-field operation 476 to write a single value (e.g., up to eight bits) to a configuration register, such as a configuration register 234 of the hardware accelerator 220 of FIG. 10. As illustrated, the word 416 containing the write-field operation 476 includes an intellectual property identifier IP ID to identify an IP associated with the write-field operation 476, a register identifier Reg ID to identify a particular register of the IP, a value Value to be written to the field, a width indication Width to indicate the width of the field, a least significant bit indicator LSB to indicate a least significant bit position of the field in the register, and an operation code 418. As illustrated, the value of the operation code is 1, which indicates the configuration operation is a write-field operation. A write-field operation 476 is performed as a read-modify-write operation.

The third example operation in the example linked list 400 of configuration operations is a burst-write operation 478 to write a determined number of values (e.g., up to 2048 values) to a configuration register, without incrementing an address of the register after each write. For example, a burst-write operation may be employed to populate a FIFO buffer. As illustrated, the word 416 containing the burst-write operation 478 includes an intellectual property identifier IP ID to identify an IP associated with the burst-write operation 478, a register identifier Reg ID to identify a particular register of the IP, a length value Length to indicate the determined number of words to be written to the register, and an operation code 418. Values of the words to be written, as illustrated Value 1 to Value n, are stored sequentially in the words 479 following the word 216 containing the burst-write operation 478. As illustrated, the value of the operation code is 2, which indicates the configuration operation is a burst-write operation. A burst-write operation 478 is performed as a write operation and previous values are overwritten.

The fourth example operation in the example linked list 400 of configuration operations is a burst-write-increment operation 480 to write a determined number of values (e.g., up to 2048 values) to a configuration register, incrementing the register address after each write. As illustrated, the word 416 containing the burst-write-increment operation 480 includes an intellectual property identifier IP ID to identify an IP associated with the burst-write-increment operation 480, a register identifier Reg ID to identify a particular register of the IP, a length value Length to indicate a number of words to be written to the register, and an operation code 418. Values of the words to be written, as illustrated Value 1 to Value n, are stored sequentially in the n words 481 following the word 216 containing the burst-write-increment operation 480. The facilitates populating a consecutive range of register using n+1 blob words, instead of using 2*n blob words associated with n write operations 474. As illustrated, the value of the operation code is 3, which indicates the configuration operation is a burst-write-increment operation. A burst-write-increment operation 478 is performed as a write operation and previous values are overwritten.

The fifth example operation in the example linked list 400 of configuration operations is a poll operation 482 to repeatedly read a specific register until a bit range of a indicated value Value matches a bit range of a value read from the register. As illustrated, the word 416 containing the poll operation 482 includes an intellectual property identifier IP ID to identify an IP associated with the poll operation 482, a register identifier Reg ID to identify a particular register of the IP, a MSB value and a LSB value to indicate the bit range to be polled, and an operation code 418. The word 216 following the word 216 containing the poll operation 482 stores a indication of a number of cycles between each read of the poll operation 482, and the next word stores the indicated value Value. As illustrated, the value of the operation code is 4, which indicates the configuration operation is a poll operation. An unused field of the word 216 is indicated by a value xxx. The poll operation 482 facilitates synchronizing execution of the linked list of configuration operations with states of the IPs being configured.

The sixth example operation in the example linked list 400 of configuration operations is a load operation 484 to load a range of values of a configuration register (e.g., a range of a register 234 of FIG. 10) into a corresponding range of an accumulator register, replacing the values of the corresponding range of the accumulator register. Other values stored in the accumulator register remain unchanged. As illustrated, the word 416 containing the load operation 484 includes an intellectual property identifier IP ID to identify an IP associated with the load operation 484, a register identifier Reg ID to identify a particular register of the IP, a MSB value and a LSB value to indicate the bit range to be loaded, and an operation code 418. As illustrated, the value of the operation code is 5, which indicates the configuration operation is a load operation. An unused field of the word 216 is indicated by a value xxx.

The seventh example operation in the example linked list 400 of configuration operations is a load-clear operation 486 to clear an accumulator register, and then load a range of values of a configuration register (e.g., a range of a register 234 of FIG. 10) into a corresponding range of the cleared accumulator register, replacing the values of the corresponding range of the cleared accumulator register. As illustrated, the word 416 containing the load-clear operation 486 includes an intellectual property identifier IP ID to identify an IP associated with the load-clear operation 486, a register identifier Reg ID to identify a particular register of the IP, a MSB value and a LSB value to indicate the bit range to be loaded, and an operation code 418. As illustrated, the value of the operation code is 6, which indicates the configuration operation is a load-clear operation. An unused field of the word 216 is indicated by a value xxx.

The eighth example operation in the example linked list 400 of configuration operations is a modify operation 488 to replace a range of values of an accumulator register with a corresponding range of a specified value Value, without clearing the accumulator register prior to performing the modify operation 488. As illustrated, the word 416 containing the modify operation 488 includes a MSB value and a LSB value to indicate the bit range to be replaced, and an operation code 418. The next word 216 in the binary blob 414 contains the specified value Value. As illustrated, the value of the operation code is 7, which indicates the configuration operation is a modify operation. An unused field or fields of the word 216 including the modify operation 488 is indicated by a value xxx.

The ninth example operation in the example linked list 400 of configuration operations is a modify-clear operation 490 to clear an accumulator register and to replace a range of values of the cleared accumulator register with a corresponding range of a specified value Value. As illustrated, the word 416 containing the modify-clear operation 490 includes a MSB value and a LSB value to indicate the bit range to be replaced, and an operation code 418. The next word 216 in the binary blob 414 contains the specified value Value. As illustrated, the value of the operation code is 8, which indicates the configuration operation is a modify-clear operation. An unused field or fields of the word 216 including the modify-clear operation 490 is indicated by a value xxx.

The tenth example operation in the example linked list 400 of configuration operations is store operation 492 to store a value of a bit range of an accumulator register into a corresponding bit range of a configuration register, such as a configuration register 234 of FIG. 10. As illustrated, the word 416 containing the store operation 492 includes an intellectual property identifier IP ID to identify an IP associated with the store operation 492, a register identifier Reg ID to identify a particular register of the IP, a MSB value and a LSB value to indicate the bit range to be stored, and an operation code 418. As illustrated, the value of the operation code is 9, which indicates the configuration operation is a store operation. An unused field of the word 216 is indicated by a value xxx.

The eleventh example operation in the example linked list 400 of configuration operations is a wait-for-interrupt operation 494 to wait for a specified interrupt or to wait for the specified interrupt for a threshold duration of time. As illustrated, the word 216 containing the wait-for-interrupt operation 494 includes a timeout value Timeout, which indicates the threshold period of time, interrupt identifier Irq ID, which identifies the specified interrupt, and an operation code 418. If the period of time is not zero and elapses before the specified interrupt is received, the configuration controller 240 generates an error interrupt and stops the configuration process. If the specified interrupt is not supported, the configuration controller 240 generates an error interrupt and stops the configuration process. As illustrated, the value of the operation code is 10, which indicates the configuration operation is a wait-for-interrupt operation.

The twelfth example operation in the example linked list 400 of configuration operations is a wait-for-trigger operation 496 to wait for a specified number of events of a specified trigger source, such as a number of rising edges of the specified trigger source. As illustrated, the word 216 containing the wait-for-trigger operation 496 includes a timeout value Timeout, which indicates the threshold period of time, trigger identifier Trig ID, which identifies the specified trigger source, and an operation code 418. The next word 497 contains a value Events indicating the specified number of events. If the period of time is not zero and elapses before the specified number of trigger events occurs, the configuration controller 240 generates an error interrupt and stops the configuration process. If the specified trigger is not supported, the configuration controller 240 generates an error interrupt and stops the configuration process. If the specified number of events is outside a threshold range, the configuration controller 240 generates an error interrupt and stops the configuration process. As illustrated, the value of the operation code is 11, which indicates the configuration operation is a wait-for-trigger operation.

The thirteenth example operation in the example linked list 400 of configuration operations is an interrupt operation 498 to set an interrupt to a host processor (e.g., host processor 102 of FIG. 9), wait for an acknowledgement, and label a specific register. As illustrated, the word 216 containing the interrupt operation 498 includes a label value Label, and an operation code 418. A label value of label=0 indicates the label is not changed. The acknowledgement may by provided by writing a 1 in an interrupt register bit. As illustrated, the value of the operation code is 12, which indicates the configuration operation is an interrupt operation.

The fourteenth example operation in the example linked list 400 of configuration operations is an interrupt-no-acknowledgement operation 500 to set an interrupt to a host processor (e.g., host processor 102 of FIG. 9), and label a specific register, without waiting for an acknowledgment. As illustrated, the word 216 containing the interrupt-no-acknowledgement operation 500 includes a label value Label, and an operation code 418. A label value of label=0 indicates the label is not changed. As illustrated, the value of the operation code is 13, which indicates the configuration operation is an interrupt-no-acknowledgement operation.

The fifteenth example operation in the example linked list 400 of configuration operations is a label operation 502 to label a specific register. As illustrated, the word 216 containing the label operation 502 includes a label value Label, and an operation code 418. A label value of label==0 indicates the label is not changed. Thus, the label operation 502 may be employed as a no-operation operation. As illustrated, the value of the operation code is 29, which indicates the configuration operation is a label operation.

The sixteenth example operation in the example linked list 400 of configuration operations is a restart operation 504 to return to the beginning of the blob 414 (e.g., to the first operation of the blob) and to label a specific register. As illustrated, the word 216 containing the label operation 504 includes a label value Label, and an operation code 418. A label value of label==0 indicates the label is not changed. As illustrated, the value of the operation code is 30, which indicates the configuration operation is a restart operation.

The seventeenth example operation in the example linked list 400 of configuration operations is a stop operation 506 to stop the configuration process (e.g., the finite state machine 242) and to label a specific register. As illustrated, the word 216 containing the label operation 504 includes a label value Label, and an operation code 418. A label value of label==0 indicates the label is not changed. As illustrated, the value of the operation code is 31, which indicates the configuration operation is a stop operation.

Embodiments of the linked list of configuration operations 400 and of the binary blob 414 of FIG. 12 may include more operations than illustrated, may include fewer operations than illustrated, may include different operations than illustrated, may combine operations, may separate operations into multiple operations, may perform operations in various orders, and various combination thereof.

For example, while the number of operations in the defined set of configuration operations from which the limited list of operations is selected may be limited (e.g., to the seventeen example operations discussed in FIG. 12), the number of operations in a linked list may include more than one instance of some operations in the defined set of operations, may include no instances of some operations in the defined set of configuration operations, etc., and various combinations thereof. The total number of configuration operations in a linked list may be many times larger that the number of configuration operations in the defined set of configuration operations due to repeated occurrences of some of the defined configuration operations in the linked list of configuration operations.

Figure 13:
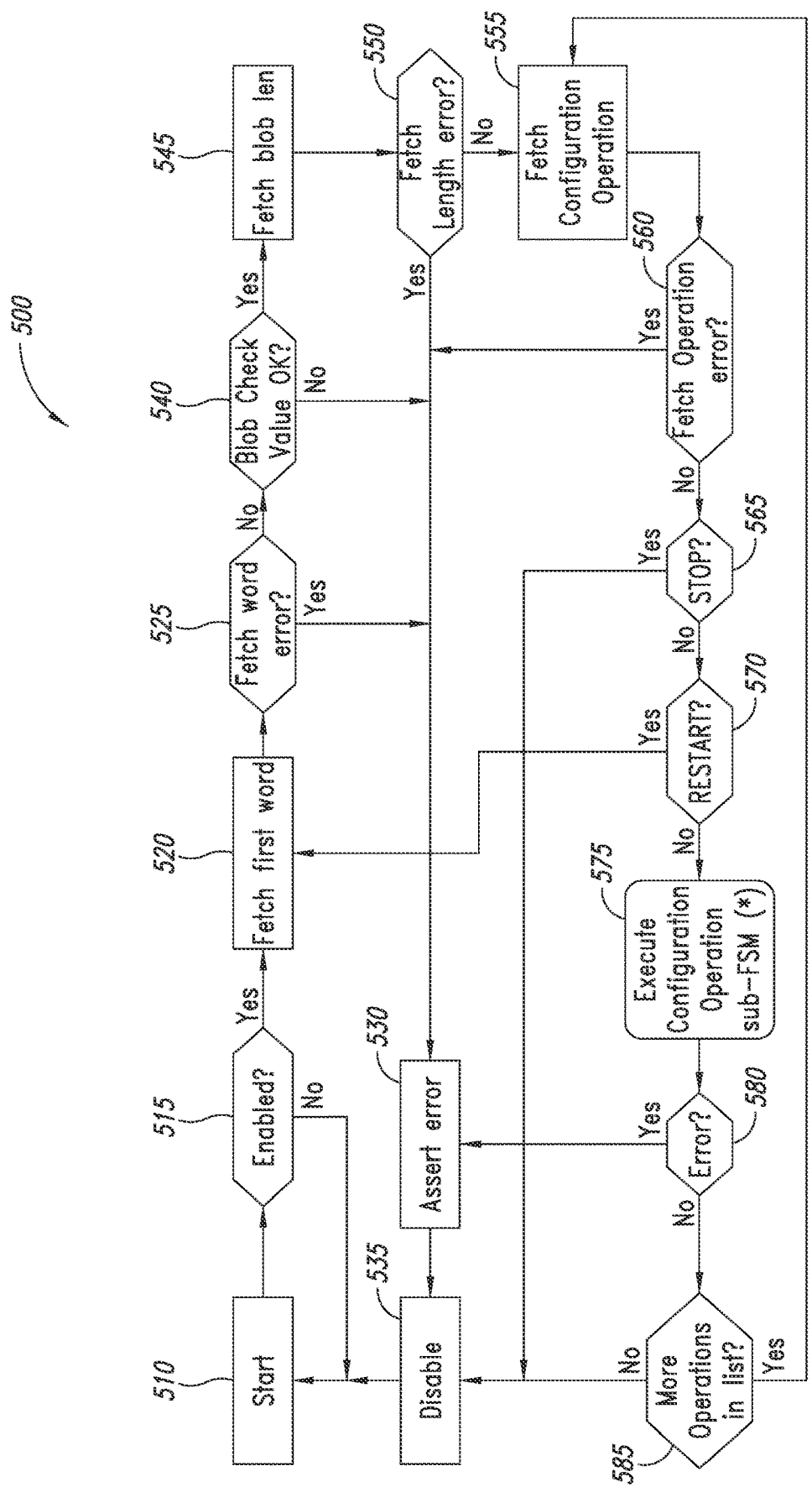
FIG. 13 illustrates an embodiment of a state machine that may be employed by a configuration controller to program one or more hardware accelerators to perform a stage of a task.

FIG. 13 illustrates an example embodiment of a finite state machine 500 that may be employed by the configuration controller 240 of FIG. 10 as the state machine 242 to manage configuration of one or more hardware accelerators 220 to perform stages of a complex task. The state machine 500 sequentially executes configuration operations in a linked list of configuration operations that may be stored as a binary blob in a memory, such as in one of the binary blobs 114 stored in the memory 104 of FIG. 9, or the linked list 400 of FIG. 12. A host processor, such as the host processor 102 of FIG. 9, may use interrupts to, for example initiate loading of the linked list and executing of the loaded linked list by the state machine 500 of the configuration controller. Similarly, the configuration controller 240 may use interrupts to communicate with the hardware accelerators 220, for example, to communicate with a configuration interface of one or more hardware accelerators 220 (see configuration interface 132 of FIG. 9). Example states and transitions of the state machine 500 will be discussed with reference to FIGS. 9, and 12 for convenience.

At start state 510, the state machine 500 starts and proceeds to enable check state 515, where the state machine 500 determines whether configuration by the configuration controller 240 of a hardware accelerator 220 to perform a stage of a complex or multi-stage task is enabled. When it is determined at enable check state 515 that configuration of hardware accelerator to perform a stage of a complex task by the configuration controller 240 is enabled, the state machine 500 proceeds from enable check state 515 to fetch first word state 520. The state machine 500 may determine whether configuration of a hardware accelerator to perform a stage of a complex task by the configuration controller 240 is enabled, for example, based on interrupts signaled by the host processor 102. When it is not determined at enable check state 515 that configuration of a hardware accelerator to perform a stage of a complex task by the configuration controller 240 is enabled, the state machine 500 returns from enable check state 515 to start state 510.

At a fetch first word state 520, the state machine 500 fetches a first word of a blob storing a linked list of configuration operations. For example a first word 416 of a blob 414 containing a blob check value 470 may be retrieved from a memory, such as memory 104 of FIG. 9. The state machine 500 proceeds from fetch first word state 520 to fetch word error check state 525.

At fetch word error check state 525, the state machine 500 determines whether a fetch error has occurred in retrieving the first word of the blob. For example, a memory address associated with a first word of the blob may be invalid, and the state machine may determine a fetch error has occurred in response to an indication the address is invalid. When it is determined at fetch word error check state 525 that a fetch error has occurred, the state machine proceeds from state 525 to assert error state 530. At asset error state 530 an error is asserted, for example, an error is signaled to a host processor 102 via an interrupt. The state machine 500 proceeds from assert error state 530 to disable state 535, where configurating of a hardware accelerator to perform a stage of a complex or multi-stage task is disabled. The state machine 500 returns from disable state 535 to start state 510.

When it is not determined at fetch word error check state 525 that a fetch error has occurred, the state machine proceeds from state 525 to blob check state 540, where the state machine determines whether a binary blob containing the linked list of configuration operations is valid. The may be done, for example, by checking whether a value stored in the first word of the binary blob is equal to an expected value, such as a value associated with configuring a particular stage of a complex task. When it is determined at blob check state 540 that the blob is valid (e.g., the first word of the blob has an expected value), the state machine 500 proceeds from blob check state 540 to fetch blob length state 545. When it is not determined at blob check state 540 that the blob is valid (e.g., the first word of the blob does not have an expected value), the state machine 500 proceeds from blob check state 540 to assert error state 530.

At a fetch blob length state 545, the state machine 500 fetches a word of a blob indicating a length of the blob storing a linked list of configuration operations. For example a second word 416 of a blob 414 containing a blob length value 472 may be retrieved from a memory, such as memory 104 of FIG. 9. The state machine 500 proceeds from fetch blob length state 545 to fetch length error check state 550.

At fetch length error check state 550, the state machine 500 determines whether a fetch error has occurred in the retrieving of a word indicating a length of the blob. For example, a memory address associated with a word of the blob containing a value indicative of the length of the blob may be invalid, or the specified length in the word may be outside a range of valid length values, and the state machine may determine a fetch error in retrieving the indication of the blob length has occurred in response. When it is determined at fetch length error check state 550 that a fetch error has occurred, the state machine proceeds from fetch error state 550 to assert error state 530. When it is not determined at fetch length error check state 550 that a fetch error has occurred, the state machine proceeds from fetch length error check state 550 to fetch configuration operation state 555.

At a fetch configuration operation state 555, the state machine 500 fetches a configuration operation in the linked list of configuration operations. For example, in a first loop a third word 416 of a blob 414 containing a configuration operation may be retrieved from a memory, such as memory 104 of FIG. 9. The state machine 500 proceeds from fetch configuration operation state 555 to fetch operation error state 560.

At fetch operation error state 560, the state machine 500 determines whether a fetch error has occurred in the retrieving of the configuration operation. For example, a memory read error may occur, or the retrieved operation may have an invalid operation code 418, and the state machine may determine a fetch error has occurred in response. When it is determined at fetch operation error state 560 that a fetch error has occurred, the state machine proceeds from fetch operation error state 560 to assert error state 530.

When it is not determined at fetch operation error state 560 that a fetch error has occurred, the state machine proceeds from fetch operation error state 560 to state 565, where the state machine 500 determines whether the configuration operation is a stop operation. With reference to FIG. 12, this may be done by determining whether a value of the operation field code 418 is a value indicating the configuration operation is a stop operation 506, in the example of FIG. 12, by determining whether the operation field code 418 has a value of 31, which indicates the operation is a stop operation 506. When it is determined at state 565 that the configuration operation is a stop operation, the state machine proceeds from state 565 to disable state 535. When it is not determined at state 565 that the configuration operation is a stop operation, the state machine 500 proceeds from state 565 to state 570.

At state 570, the state machine 500 determines whether the configuration operation is a restart operation. With reference to FIG. 12, this may be done by determining whether a value of the operation field code 418 is a value indicating the configuration operation is a restart operation 504, in the example of FIG. 12, by determining whether the operation field code 418 has a value of 30, which indicates the operation is a restart operation 504. When it is determined at state 570 that the configuration operation is a restart operation, the state machine proceeds from state 570 to fetch first word state 520. When it is not determined at state 570 that the configuration operation is a restart operation, the state machine 500 proceeds from state 570 to state 575.

At state 575, the state machine 500 executes the configuration operation. This may be performed by executing a sub finite state machine. For example, FIG. 14, discussed in more detail below, illustrates an embodiment of a sub finite state machine 600 to execute a write configuration operation, such as a write configuration operation 474 of FIG. 12. The state machine 500 proceeds from state 575 to error check state 580, where the state machine 500 determines whether an error occurred during the execution of the configuration operation. For example, a timeout may occur during a configuration operation and the state machine may determine an error has occurred during the execution of the configuration operation in response to the timeout. When it is determined at check error state 580 that an error has occurred during the execution of the configuration operation, the state machine proceeds from check error state 580 to assert error state 530. When it is not determined at check error state 580 that an error has occurred during the execution of a configuration operation, the state machine proceeds from check error state 580 to more operations check state 585.

At more operations check state 585, the state machine 500 determines whether there are more configuration operations in the linked-list of configuration operations to be executed. This may be determined, for example, based on the indication of the length of the blob retrieved at state 454 (e.g., if the end of the list indicated by the indication of the length has not been reached, there are more configuration operations to be executed). When it is determined at more operations check state 585 that there are more configuration operations in the linked list to be executed, the state machine proceeds from state 585 to state 555 to fetch the next configuration operation in the linked list. When it is not determined at more operations check state 585 that there are more configuration operations in the linked list to be executed, the state machine proceeds from more operations check state 585 to disable state 535.

Embodiments of the state machine 500 of FIG. 13 may include more states and transitions than illustrated, may include fewer states and transition than illustrated, may combine states, may separate states into sub-states, may include different transitions, and various combination thereof. For example, in some embodiments the state machine 500 may include an optional decryption state (see decryption state 360 in FIG. 11). In another example, states 565, 570 and 575 may be combined in some embodiments. In another example, more operations check state 585 may be omitted in some embodiments, and the state machine 500 may return to state 555 when it is not determined at state 580 than an error has occurred, with the state machine 500 detecting the end of the linked list based on detecting of a stop operation at state 565.

Figure 14:
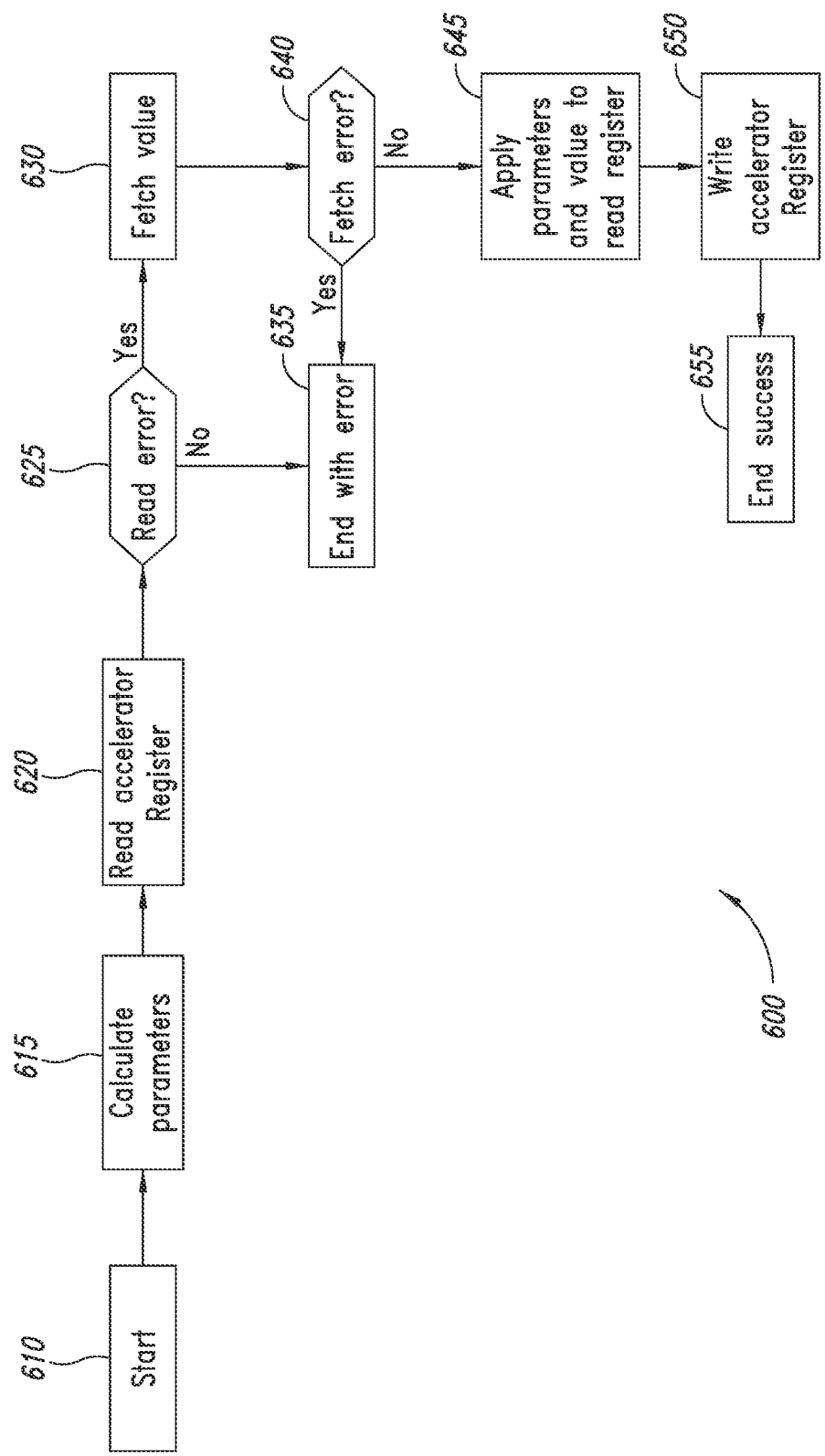
FIG. 14 illustrates an embodiment of a sub finite state machine that may be employed by a state machine configuration controller to execute a write operation as part of programming one or more hardware accelerators to perform a stage of a task.

FIG. 14 illustrates an example embodiment of a sub finite state machine 600 that may be employed by the configuration controller 240 of FIG. 10 to execute a write configuration operation, such as a write operation 474 of FIG. 12. For example, state machine 500 of FIG. 13 may employ sub finite state machine 600 to execute a write operation at state 575.

The sub finite state machine 600 begins at start state 610, and proceeds to calculate parameters state 615. With reference to FIG. 12, values of the intellectual property identifier IP ID, the register identifier Reg ID, a most significant bit indicator MSB, a least significant bit indicator LSB stored in the word 416 containing the write operation 474 may be extracted and used as or to determine values of the parameters of the write operation 474. After the parameters of the write operation 474 are determined at state 615, the sub finite state machine 600 proceeds from calculate parameters state 615 to read accelerator register state 620.

At read accelerator register state 620, the sub finite state machine 600 reads a value stored in a register of an intellectual property identified by the parameters determined in calculate parameters state 615. With reference to FIGS. 9, 10 and 12, a value stored in a particular configuration register 234 identified by the extracted value of the register identifier Reg ID of a particular hardware accelerator 220 identified by the intellectual property identifier IP ID is read in read accelerator register state 620. It is noted that the intellectual property identifier may identify a particular set of registers of a particular hardware accelerator, such as a set of registers of a stream switch 122 of FIG. 9. After the value stored the particular register of the particular intellectual property is read at state 620, the sub finite state machine 600 proceeds from read accelerator register state 620 to read error check state 625.

At read error check state 625, the sub finite state machine 600 determines whether a read error has occurred in the reading of the identified register of the identified intellectual property read at read accelerator register state 620. For example, an interrupt may be received from a hardware accelerator which indicates a read error has occurred. When it is determined at read check state 625 that a read error has occurred, the sub finite state machine 600 proceeds from read error check state 625 to end with error state 635. At end with error state 635, the sub finite state machine 600 returns an error message. With reference to FIG. 13, the state machine 500 may respond to the error message by proceeding from error check state 580 to assert error state 530.

When it is not determined at read error check state 625 that a read error has occurred, the sub finite state machine proceeds from read error check state 625 to fetch operation value state 630, where the sub finite state machine 600 fetches a value from the binary blob associated with the write operation. With reference to FIG. 12, this may be done by fetching the value of the next word 416 of the binary blob 414 following the word 416 containing the write operation 474. After the value stored in the next word associated with the write operation is fetched at fetch operation value state 630, the sub finite state machine 600 proceeds from the fetch operation value state 630 to fetch error check state 640.

At fetch error check state 640, the sub finite state machine 600 determines whether a fetch error has occurred in the fetching of the value associated with the write operation. For example, an interrupt may be received from a memory which indicates a fetch error has occurred when fetching the value from a binary blob stored in the memory, a fetched value may be outside a range of permissible fetched values, etc., and the sub finite state machine 600 may determine that an error has occurred in response to the interrupt or to the value being outside of the permissible range of fetched values. When it is determined at fetch error check state 640 that a fetch error has occurred, the sub finite state machine 600 proceeds from fetch error check state 640 to end with error state 635.

When it is not determined at fetch error check state 640 that a fetch error has occurred, the sub finite state machine 600 proceeds from fetch error check state 640 to apply parameters and fetched value state 645, where the sub finite state machine 600 modifies the value read from the register at 620 in the range specified by most significant bit and least significant bit parameters determined at 615 based on the value fetched from the binary blob at 630. The sub finite state machine 600 proceeds from apply parameters and fetched value state 645 to write accelerator register state 650.

At write accelerator register state 650, the sub finite state machine 600 writes the value modified at apply parameters and fetch value state 645 to the register determined in calculate parameters state 615. After the modified value is stored the determined register, the sub finite state machine 600 proceeds from write accelerator register state 650 to end with success state 655. At end with success state 655, the sub finite state machine 600 returns a success message. With reference to FIG. 13, the state machine 500 may respond to the success message by proceeding from error check state 580 to more operations check state 585.

Embodiments of the sub state machine 600 of FIG. 14 may include more states and transitions than illustrated, may include fewer states and transition than illustrated, may combine states, may separate states into sub-states, may include different transitions, and various combination thereof. For example, in some embodiments the sub finite state machine 600 may transition to a write error check state after the write accelerator register state 650. In another example, an intellectual property identifier IP ID may identify a plurality of intellectual properties (such as a set of hardware accelerators), and the write operation may be performed on the identified register of the plurality of intellectual properties in parallel.

Use of an embodiment of a configuration controller (such as configuration controller 240 of FIG. 10, executing a finite state machine, such as the finite state machine 300 of FIG. 11 or the finite state machine 500 of FIG. 13) to execute a linked list of configuration operations, consisting of configuration operations selected from a defined set of configuration operations (e.g., native instructions), to configure a hardware accelerator facilitates providing many advantages over the use of a host processor or a dedicated general purpose processor to configure a hardware accelerator. For example, the decoding of the individual configuration operation of a linked list may be performed in a single clock cycle using an embodiment of a configuration controller as disclosed herein due to the configuration operations being selected from a defined set of configuration operations. In contrast, a host processor or a dedicated general purpose processor typically requires several clock cycles to decode each configuration instruction, and typically requires more clock cycles to execute the decoded configuration instruction than typically required by an embodiment of a configuration controller as disclosed herein to execute a corresponding configuration operation.

In addition, use of the configuration controller frees up host processor resources for other tasks and, as compared to use of a host processor, facilitates faster data transfers because the configuration controller may be located close to or inside of the hardware accelerator. As compared to a dedicated general purpose processor, the configuration controller, in addition to facilitating significant reductions in the number cycles required to configure a stage of a multi-stage process, facilitates using substantially less area and other system resources (e.g., power) than a dedicated general purpose processor.

In an embodiment, a device comprises a hardware accelerator, a memory and a configuration controller coupled to the hardware accelerator and to the memory. The hardware accelerator comprises a plurality of configuration registers. The configuration controller, in operation, executes a finite state machine. The finite state machine controls execution of a linked list of configuration operations. The linked list of configuration operations consist of configuration operations selected from a defined set of configuration operations. The executing the linked list of configuration operations configures the plurality of registers of the hardware accelerator to control operations of the hardware accelerator associated with a stage of a multi-stage processing task.

In an embodiment, the finite state machine comprises a wait state, a load list state and an execute configuration operation state. In an embodiment, the finite state machine comprises a decryption state and a validity check state.

In an embodiment, the configuration controller, in operation, retrieves a binary blob from the memory, the binary blob including the linked list of configuration operations. In an embodiment, the binary blob comprises a plurality of configuration words and the configuration operations of the linked list of configuration operations are included in respective configuration words of the plurality of configuration words. In an embodiment, the plurality of configuration words include words storing control parameters or data associated with configuration operations of the linked list of configuration operations. In an embodiment, the linked list of configuration operations includes more than one instance of an operation selected from the defined set of configuration operations. In an embodiment the plurality of registers comprises a plurality of configuration registers.

In an embodiment, a system comprises a host processor, a memory, a hardware accelerator, and a configuration controller. The host processor, in operation, controls execution of a multi-stage processing task. The memory, in operation, stores data and configuration information. The hardware accelerator includes a plurality of functional circuits and a plurality of configuration registers. The configuration controller is coupled to the host processor, the hardware accelerator, and the memory. The configuration controller, in operation, executes a finite state machine to control execution of a linked list of configuration operations, the linked list of configuration operations consisting of configuration operations selected from a defined set of configuration operations. Executing the linked list of configuration operations configures the plurality of configuration registers of the hardware accelerator to control operations of the hardware accelerator associated with a stage of the multi-stage processing task.

In an embodiment, the configuration controller, in operation, retrieves a binary blob from the memory, the binary blob including the linked list of configuration operations. In an embodiment, the configuration controller comprises cryptographic circuitry, which, in operation, decrypts words of the binary blob retrieved from the memory. In an embodiment, the system comprises a configuration bus and a data bus, wherein the configuration controller, in operation: responds to an indication to retrieve the binary blob received from the host processor via the configuration bus by retrieving the binary blob from the memory via the data bus. In an embodiment, the data bus is a streaming data bus.

In an embodiment, the configuration controller, in operation: waits for an indication to execute the retrieved linked list of configuration operations; and responds to an indication to execute the linked list of configuration operations received from the host processor via the configuration bus by executing the linked list of configuration operations.

In an embodiment, the binary blob comprises a plurality of configuration words and the configuration operations of the linked list of configuration operations are included in respective configuration words of the plurality of configuration words.

In an embodiment, a method comprises retrieving, by a configuration controller from a memory, configuration operations of a linked list of configuration operations, the linked list of configuration operations consisting of configuration operations selected from a defined set of configuration operations; and executing, under control of a finite state machine executed by the configuration controller, the retrieved configuration operations of the linked list of configuration operations. The executing of the retrieved configuration operations of the linked list of configuration operations configures a plurality of registers of a hardware accelerator to control operations of the hardware accelerator associated with a stage of a multi-stage processing task controlled by a host processor.

In an embodiment, the method comprises retrieving a binary blob from the memory, the binary blob including the linked list of configuration operations. In an embodiment, the method comprises decrypting the binary blob. In an embodiment, the method comprises verifying a validity of the linked list of configuration operations prior to executing the linked list of configuration operations.

In an embodiment, a non-transitory computer-readable medium's contents cause a configuration controller to perform a method. The method comprises sequentially executing individual operations of a linked list of configuration operations under control of a finite state machine executed by the configuration controller. The linked list of configuration operations consists of configuration operations selected from a defined set of configuration operations. The executing of the linked list of configuration operations configures a plurality of registers of a hardware accelerator to control operations of the hardware accelerator associated with a stage of a multi-stage processing task controlled by a host processing system.

In an embodiment, the contents comprise a binary blob including the linked list of configuration operations. In an embodiment, the method comprises retrieving the binary blob from a memory of the host processing system.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a hardware accelerator, comprising a plurality of registers:
a memory; and
a configuration controller coupled to the hardware accelerator and to the memory, wherein the configuration controller, in operation, executes a finite state machine, wherein the finite state machine controls execution of a linked list of configuration operations, the linked list of configuration operations consisting of configuration operations selected from a defined set of configuration operations, wherein the executing the linked list of configuration operations configures the plurality of registers of the hardware accelerator to control operations of the hardware accelerator associated with a stage of a multi-stage processing task, wherein the configuration controller, in operation, retrieves a binary blob from the memory, the binary blob including the linked list of configuration operations.

2. The device of claim 1, wherein the finite state machine comprises a wait state, a load list state and an execute configuration operation state.

3. The device of claim 2, wherein the finite state machine comprises a decryption state and a validity check state.

4. The device of claim 1, wherein the binary blob comprises a plurality of configuration words and the configuration operations of the linked list of configuration operations are included in respective configuration words of the plurality of configuration words.

5. The device of claim 4, wherein the plurality of configuration words include words storing control parameters or data associated with configuration operations of the linked list of configuration operations.

6. The device of claim 1, wherein the linked list of configuration operations includes more than one instance of an operation selected from the defined set of configuration operations.

7. The device of claim 1, wherein the plurality of registers comprises a plurality of configuration registers.

8. A system, comprising
a host processor, which, in operation, controls execution of a multi-stage processing task;
a memory, which, in operation, stores data and configuration information;
a hardware accelerator, the hardware accelerator including:
a plurality of functional circuits; and
a plurality of configuration registers; and
a configuration controller coupled to the host processor, the hardware accelerator, and the memory, wherein the configuration controller, in operation:
executes a finite state machine to control execution of a linked list of configuration operations, the linked list of configuration operations consisting of configuration operations selected from a defined set of configuration operations, wherein the executing the linked list of configuration operations configures the plurality of configuration registers of the hardware accelerator to control operations of the hardware accelerator associated with a stage of the multi-stage processing task, wherein the configuration controller, in operation, retrieves a binary blob from the memory, the binary blob including the linked list of configuration operations.

9. The system of claim 8, wherein the configuration controller comprises cryptographic circuitry, and the cryptographic circuitry, in operation, decrypts words of the binary blob retrieved from the memory.

10. The system of claim 8, comprising a configuration bus and a data bus, wherein the configuration controller, in operation:

responds to an indication to retrieve the binary blob received from the host processor via the configuration bus by retrieving the binary blob from the memory via the data bus.

11. The system of claim 10, wherein the data bus is a streaming data bus.

12. The system of claim 10, wherein the configuration controller, in operation:
waits for an indication to execute the retrieved linked list of configuration operations; and
responds to an indication to execute the linked list of configuration operations received from the host processor via the configuration bus by executing the linked list of configuration operations.

13. The system of claim 8, wherein the binary blob comprises a plurality of configuration words and the configuration operations of the linked list of configuration operations are included in respective configuration words of the plurality of configuration words.

14. A method, comprising:
retrieving, by a configuration controller from a memory, configuration operations of a linked list of configuration operations, the linked list of configuration operations consisting of configuration operations selected from a defined set of configuration operations; and
executing, under control of a finite state machine executed by the configuration controller, the retrieved configuration operations of the linked list of configuration operations, the executing of the retrieved configuration operations of the linked list of configuration operations configuring a plurality of registers of a hardware accelerator to control operations of the hardware accelerator associated with a stage of a multi-stage processing task controlled by a host processor, wherein the method comprises retrieving a binary blob from the memory, the binary blob including the linked list of configuration operations.

15. The method of claim 14, comprising decrypting the binary blob.

16. The method of claim 14, comprising verifying a validity of the linked list of configuration operations prior to executing the linked list of configuration operations.

17. A non-transitory computer-readable medium having contents which cause a configuration controller to perform a method, the method comprising:
sequentially executing individual operations of a linked list of configuration operations under control of a finite state machine executed by the configuration controller, the linked list of configuration operations consisting of configuration operations selected from a defined set of configuration operations, the executing of the linked list of configuration operations configuring a plurality of registers of a hardware accelerator to control operations of the hardware accelerator associated with a stage of a multi-stage processing task controlled by a host processing system, wherein the contents comprise a binary blob including the linked list of configuration operations.

18. The non-transitory computer-readable medium of claim 17, wherein the method comprises retrieving the binary blob from a memory of the host processing system.

* * * * *